United States Patent [19]

Smith et al.

[11] Patent Number: 5,481,407
[45] Date of Patent: Jan. 2, 1996

[54] APPARATUS AND PROCESS FOR USING FRESNEL ZONE PLATE ARRAY FOR PROCESSING MATERIALS

[75] Inventors: Adlai H. Smith, San Diego; Robert O. Hunter, Jr., Rancho Santa Fe; Bruce B. McArthur, San Diego, all of Calif.

[73] Assignee: Litel Instruments, San Diego, Calif.

[21] Appl. No.: 121,060

[22] Filed: Sep. 14, 1993

[51] Int. Cl.$^6$ .............................. G02B 3/08; B23K 26/00
[52] U.S. Cl. ................ 359/742; 219/121.68; 219/121.69
[58] Field of Search ..................................... 359/742, 743; 219/121.68, 121.69

[56] References Cited

U.S. PATENT DOCUMENTS

| | | | |
|---|---|---|---|
| 4,909,818 | 3/1990 | Jones | 219/121.68 |
| 5,223,693 | 6/1993 | Zumoto et al. | 219/121.68 |

Primary Examiner—Scott J. Sugarman
Attorney, Agent, or Firm—Townsend and Townsend and Crew

[57] ABSTRACT

An apparatus for using and a process of using a Fresnel zone plate array is utilized for processing materials. An optically stable frame receives coherent light and passes the coherent light through beam processing optics such as a collimator, a beam expanding telescope and an aperture. Thereafter, the beam is routed to scanning mirrors immediately overlying a Fresnel zone plate array. The Fresnel zone plate array has a plurality of discrete subapertures with each subaperture containing image information at a discrete working distance from the plate; each image produced by a subaperture of the Fresnel zone plate array typically differs from adjacent images from adjacent subapertures typically in size, shape or gain. The beam is scanned and registered to a discrete selected subaperture on the plate to cause an image from the subaperture to form on a work piece located at the working distance of a scanned subaperture. Once the image is selected, the work piece is moved relative to the Fresnel zone plate array to register the image of the discrete subaperture at the required location for processing on the work piece. At each location for processing utilizing a particular selected image, the work piece is positioned, and the laser pulsed with the selected image causing processing of the work piece. Utilizing the disclosed apparatus and process, a work piece can be configured by multiple image exposures from arbitrarily selected subapertures on the Fresnel zone plate array to produce a precisely spaced and precisely configured array of holes or other shapes of extreme small dimension.

31 Claims, 6 Drawing Sheets

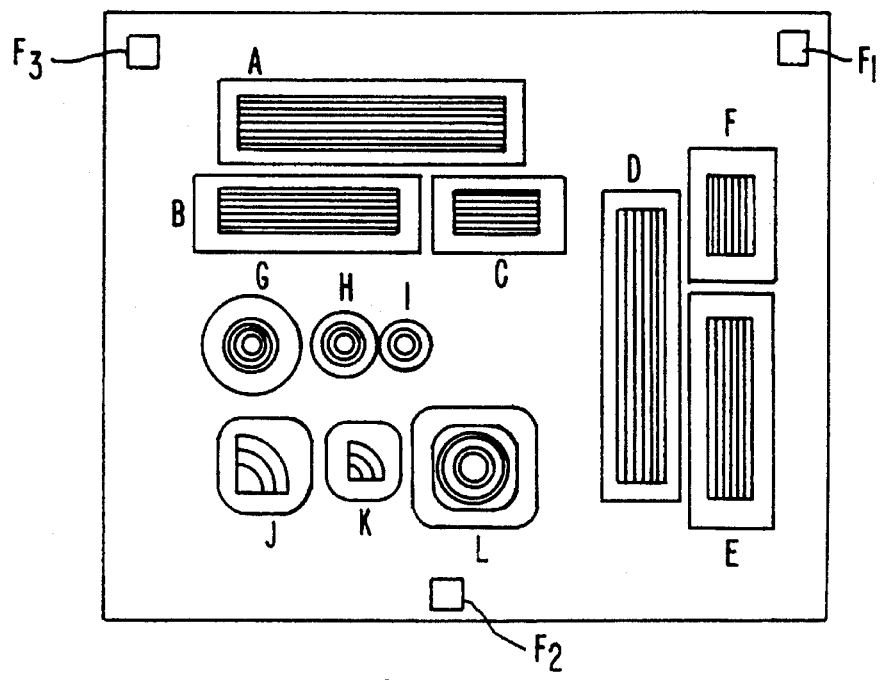
FIG. 4.
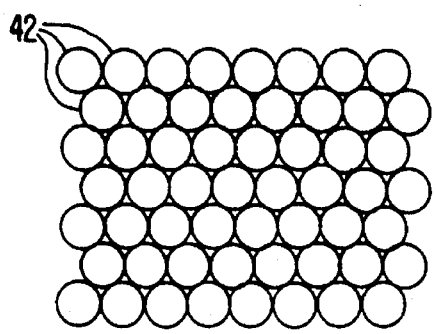
FIG. 5A.
FIG. 5B.
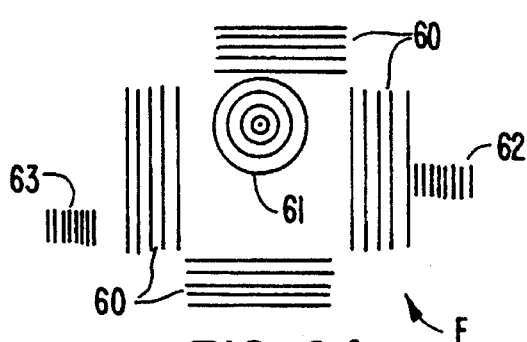
FIG. 6A.
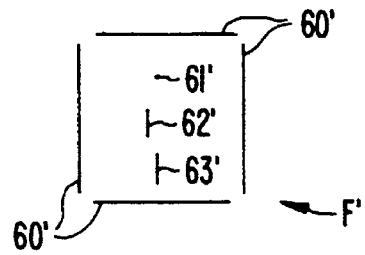
FIG. 6B.

APPARATUS AND PROCESS FOR USING FRESNEL ZONE PLATE ARRAY FOR PROCESSING MATERIALS

This invention relates to a machine and process for utilizing so-called "Fresnel zone plate arrays" to process materials. Specifically an apparatus and process is disclosed in which Fresnel zone plate arrays can be utilized for patterning a work piece such as polyimide with small precise features—such as precise circles and polygons useful in such fields as ink jets or electronic circuits.

Background of the Invention

In U.S. patent application Ser. No. 07/940,008 filed Sep. 3, 1992 now U.S. Pat. No. 5,362,940 which is a continuation of U.S. application Ser. No. 07/612,212 entitled "Use of Fresnel Zone Plates for Material Processing" filed Nov. 9, 1990 by Bruce G. MacDonald, Robert O. Hunter, Jr; Adlai H. Smith, and Clark C. Guest, now abandoned, a Fresnel zone plate array for the processing of materials is disclosed. The plate contains discrete subapertures. Each discrete subaperture includes image information.

The image information of each subaperture brings coherent light—typically from a laser source—incident upon the subaperture to a confluence at a discrete distance and angularity from the subaperture. The same subaperture—utilizing constructive and destructive interference at a discrete distance from the subaperture produces an image. An example of such a plate can be a number of discrete subapertures each focusing incident light to drill a group of precisely spaced and precisely dimensioned side-by-side holes or "vias." Such an array of holes can have utility for ink jet printer heads or multichip modules. This patent application is incorporated herein by reference.

In the following disclosure, an apparatus for the use of the Fresnel zone plate arrays is specifically set forth.

Summary of the Invention

An apparatus for using and a process of using a Fresnel zone plate array is utilized for processing materials. An optically stable frame receives coherent light and passes the coherent light through beam processing optics such as a collimator, a beam expanding telescope and an aperture. Thereafter, the beam is routed to scanning mirrors immediately overlying a Fresnel zone plate array. The Fresnel zone plate array has a plurality of discrete Fresnel zones with each subaperture containing image information at a discrete distance from the plate; each image produced by a subaperture of the Fresnel zone plate array typically differs from adjacent images produce by subapertures typically in size, shape or gain. The beam is scanned and registered to a discrete selected subaperture on the plate to cause an image from the subaperture to form on a work piece located at a discrete distance from the scanned subaperture. Once the image is selected, the work piece is moved relative to the Fresnel zone plate array to register the image of the discrete subaperture at the required location for processing on the work piece. At each location for processing utilizing a particular selected image, the work piece is positioned, and the laser pulsed with the selected image causing processing of the work piece. Utilizing the disclosed apparatus and process, a work piece can be configured by multiple image exposures from arbitrarily selected subapertures on the Fresnel zone plate array to produce a precisely spaced and precisely configured array of holes or vias of extreme small dimension. Consequently, the array produced on the work piece is an arbitrarily assembled composite of the array of images of the Fresnel zone plate array. Additionally, the work piece can contain complex processed areas such as apertures resulting from coincident multiple image exposures from the discrete subapertures of the Fresnel zone plate array.

BRIEF DESCRIPTION OF THE DRAWINGS

FIG. 4 is a detail of a plate having more complex shapes;

FIG. 5A is a "fly's eye" matrix of subapertures— Fresnel zone plates or otherwise—utilized to average beam intensity at the work piece, the averaging technique being applicable to any of the elements of the plates of FIGS. 3A and 4;

FIG. 5B illustrates a solidly ablated circular region created by the fly's eye subaperture plate of FIG. 5A;

FIG. 6A is a Fresnel zone plate array pattern and FIG. 6B is the resultant image, this pattern being used to align the Fresnel zone subaperture plate array with respect to the work piece;

DESCRIPTION OF THE PREFERRED EMBODIMENT

Figure 1:
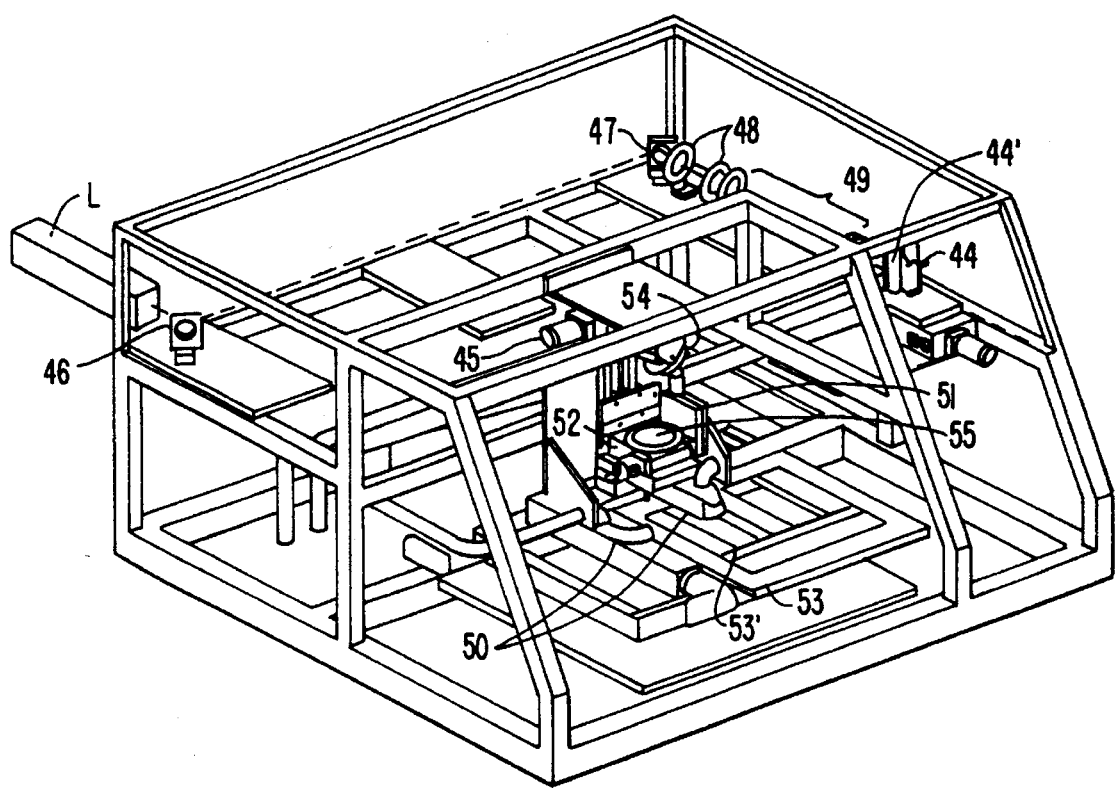
FIG. 1 is a perspective view of the apparatus of this invention illustrating an optical frame with mounted beam processing optics for addressing and scanning a beam to a Fresnel zone plate array for production of working images to a moveable work piece.

FIG. 1 is a perspective view of the apparatus of this invention. The laser source (not shown) is chosen based upon the absorption characteristics of the work piece as well as the desired beam divergence and uniformity. The laser beam is directed by folding mirrors 46 and 47 into beam expanding/condensing lenses 49 and beam collimating lenses 48. Folding mirrors 44 and 54 then direct the beam to Fresnel zone plate array 55. Plate 55 is mounted to angular or Θ positioner 52. After the beam is shaped by plate 55, it impinges on work piece 53'. Work piece 53' is mounted to an XY stage. Ducts 50 is used either to direct air onto the work piece or to exhaust fumes away from the work piece. It is also possible to use two separate duct systems so that the functions of blowing and exhausting can be performed simultaneously. If debris is not removed during the processing of the work piece, it is possible for portions of the work piece to be partially obscured, resulting in an incomplete pattern being formed.

Desirable appurtenance to the lens train can include a laser beam pointing stabilizer before or after 46. This devices assures that the laser source is given the correct angularity during laser operation. Such devices are known.

Folding mirrors 44' and 54 serve multiple functions in the preferred embodiment. First, the mirrors are used to address separate subapertures of the Fresnel zone plate array 55 with the laser beam. Second, they are used to scan the laser beam across plate 55. In the scanning mode, the laser beam can be continuously scanned across an individual subaperture on plate 55, or the laser can be pulsed while dwelling on a subaperture of 55, the beam moved to a different subaperture on plate 55, and then the process repeated.

Two different embodiments of scanning and repositioning are possible with the invention. First, as discussed above, mirrors 44' and 54 can be used to reposition the laser beam relative to zone plate array 55. The X–Y stage moves the work piece 53'. Second, the position of the laser beam can be held constant and zone plate array 55 moved relative to the beam. Again, X–Y stage 53' moves the work piece. In the preferred embodiment both positioning mechanisms are used thereby gaining the maximum number of degrees of freedom in operation. Further, in this embodiment both zone plate array 55 and work piece 53' can be rotated within their respective X–Y planes.

Figure 2:
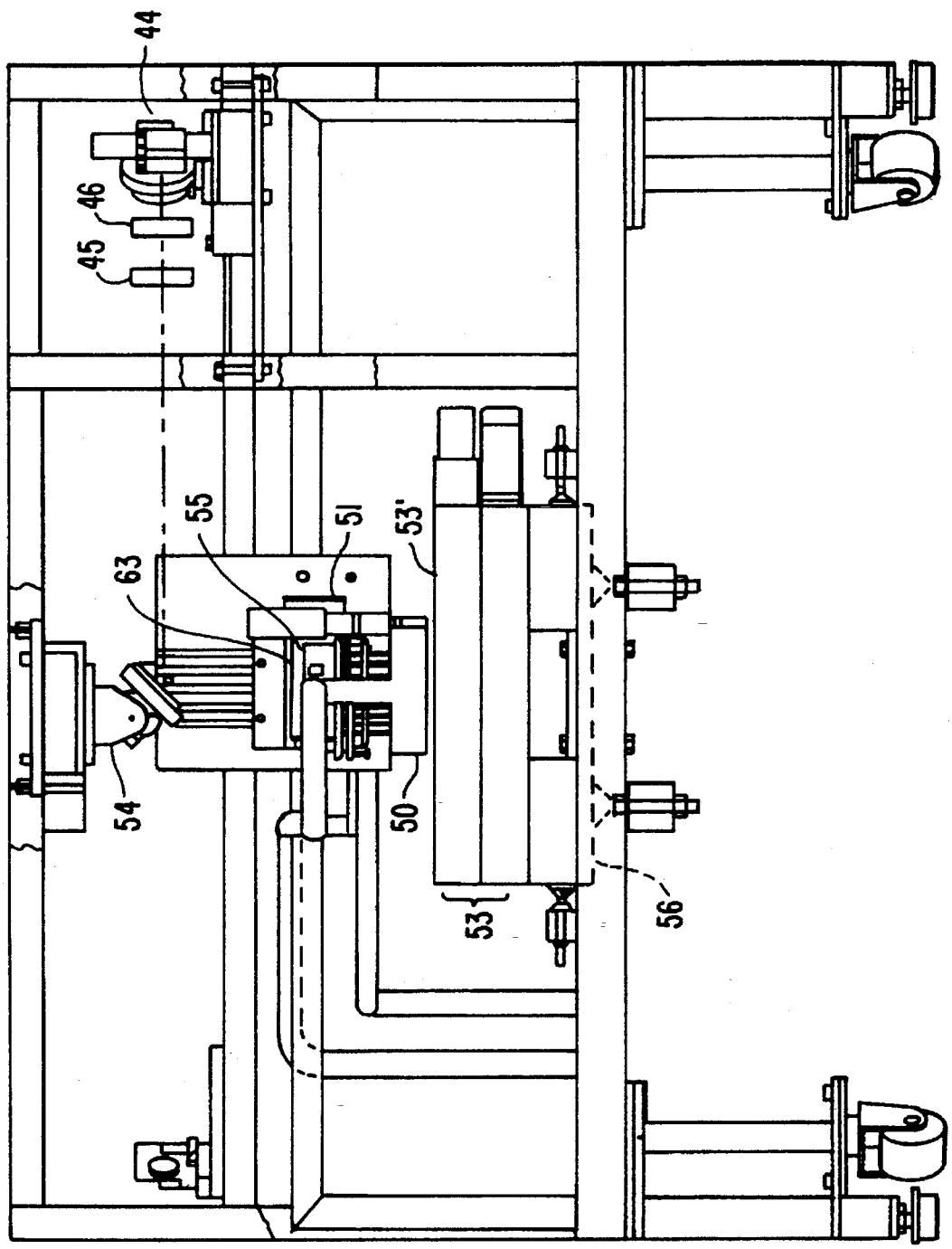
FIG. 2 is an elevation section of the machine of FIG. 1 illustrating the mounting of the work piece relative to the Fresnel zone plate array.

FIG. 2 illustrates the relation of work piece 53' to Fresnel zone plate array 55. Fold mirrors 44' and 54 direct the beam down to plate 55 which is mounted to an independent XYZ stage. This view shows the mounting of air duct 50 directly to the Fresnel zone plate array positioning stage. Work piece positioning stage 53 is mounted to an isolated granite slab 56. This insures stability of the work piece during processing.

Figure 3A:
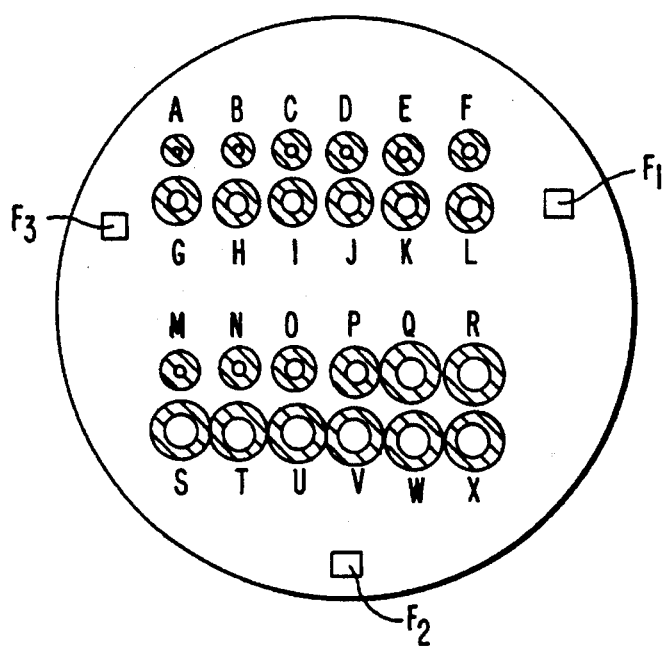
FIG. 3A is a plan view of a plate containing the subapertures of this invention.

FIG. 3A is a plan view of a plate containing a series of Fresnel zone plate arrays. Each of the areas marked A through X indicates an individual subaperture. In the simplest configuration, each subaperture would ablate a hole in the work piece, the size of the hole being defined by the Fresnel zone plate. These subapertures could also define other patterns. For example, subaperture X could define a doughnut shaped pattern. Although the effect would still be to create a hole in the work piece, the doughnut shaped pattern would allow a larger hole to be made with less laser energy. This is because the total required energy is lower when the beam is confined to a smaller area on the work piece.

Figure 3B:
FIG. 3B is a detail of one of the subapertures of the plate of FIG. 3A.

FIG. 3B is a detail of one of the individual subapertures of the plate shown in FIG. 3A. Area 32 is the active region of the subaperture. This is the area which is used to shape the beam to the desired pattern. Area 34 defines the region of the impinging beam which is not used in the formation of the final pattern on the work piece. Area 34 can either define an absorber, a reflector, or a deflector. Thus if the impinging beam is the diameter of area 34, then only the central portion of the beam, that defined by area 32, will be used in the actual processing of the work piece.

Area 34 can operate in several ways. In the preferred embodiment area 34 diffracts the energy away from the desired image on the work piece. Area 34 can also be covered by an absorber or with a reflective coating.

FIG. 4 is a plan view of a more complex Fresnel zone plate array showing subapertures A through L. Each subaperture contains an active region and a surrounding throw away region similar to that shown in FIG. 3B. The throw away or beam discard area is shown by cross hatching. Subapertures A–C create slots of varying length running along the X-axis while subapertures D–F would create similar slots running perpendicular to the X-axis. Note that by rotating either the Fresnel zone plate array or the work piece, one set of slots can be used to create both sets of slots as well as slots running at any other angle to the X-axis. Subaperture G creates a 360° circular ring of light on the work piece. Subapertures H–I create circular holes in the work piece. Subaperture J creates a 90° partial ring of light; subaperture K creates a full, solidly ablated quarter circle of light, while subaperture L creates the outline of a rectangle.

Representative dimensions produced by the apertures can be instructive. Table 1 illustrates the dimensions of images produced by the plate of FIG. 3A; Table 2 illustrates the dimensions of the plate of FIG. 4. In the following Table 1, it will be seen that apertures A though L and M through X produce the same dimension holes. However, due to the larger plate zones of apertures M through X, the latter in collecting more light have large gain at their respective working images.

Further, and in the following Table 1, several of the apertures are described as "cutouts." These respective cutouts burn a ring in the material. The central portion is not burned but either evacuated by the blower apparatus or left as scraps when the work piece is removed.

TABLE 1

| | | legend for FIG. 3A | | |
|---|---|---|---|---|
| L | Dv | Dlen | Dtot | T |
| A | 1.0 | 0.92 | 4.92 | S |
| B | 1.5 | 1.38 | 5.38 | S |
| C | 2.0 | 1.64 | 5.84 | S |
| D | 2.5 | 2.28 | 6.28 | S |
| E | 3.0 | 2.72 | 6.72 | S |
| F | 3.5 | 3.11 | 7.11 | S |
| G | 4.0 | 3.50 | 7.50 | S |
| H | 4.5 | 4.0 | 8.0 | S |
| I | 5.0 | 4.0 | 8.0 | S |
| J | 15.0 | 4.0 | 8.0 | C |
| K | 31.0 | 4.0 | 8.0 | C |
| L | 62.0 | 4.0 | 8.0 | C |
| M | 1.0 | 1.04 | 5.84 | S |
| N | 1.5 | 2.76 | 6.76 | S |
| O | 2.0 | 3.68 | 7.68 | S |
| P | 2.5 | 4.56 | 8.56 | S |
| Q | 3.0 | 5.44 | 9.44 | S |
| R | 3.5 | 6.0 | 10.0 | S |
| S | 4.0 | 6.0 | 10.0 | S |
| T | 4.5 | 6.0 | 10.0 | S |
| U | 5.0 | 6.0 | 10.0 | S |
| V | 15.0 | 6.0 | 10.0 | C |
| W | 31.0 | 6.0 | 10.0 | C |
| X | 62.0 | 6.0 | 10.0 | C |

L = lens designator
Dv = via diameter (.001")
Dlen = diameter of active part of lens (mm)
Dtot = diameter including throw skirt (mm)
T = lens types. S, solid ablation. C, cutout.

Table 2'—Legend for FIG. 4

A, B, C—lenses creating horizontal slots of various lengths.
D, E, F—lenses creating vertical slots of various lengths.
G—lens creating full circle cutouts or excisions.
H, I—lenses creating a solidly ablated circle.
J—lens creating a quarter circle slot.
K—lens creating a solidly ablated quarter circle.

L—lens creating a solidly ablated square.

FIG. 5A is an illustration of a "fly's eye" lens in which each element 42 produces the same pattern at the work piece. For example, if such a lens is used to produce the solidly ablated circle of FIG. 5B then each element would create an individual circle, all of the circles lying coincident at the plane of the work piece. The advantage of this plate over that of one with a single subaperture is that the inherent non-uniformities of the laser beam are somewhat averaged out. Thus while a non-uniform beam processed through a single subaperture plate might create only a partially ablated circle due to areas of insufficient energy density, the fly's eye plate would create a completely ablated circle.

In order to create the fly's eye element of FIG. 5A, three individual characteristics of each subaperture must be controlled. First, when the element distance is properly set, the individual patterns all accurately overlie one another and produce the image of FIG. 5B. Second, each pattern's working distance from the particular lens of the fly's eye that produces it must individually adjusted to produce the required coincidence. Third, the actual pattern must be individually controlled to have the proper angularity to produce the required co-incidence. Note that the individual elements can be simple lenses or the more complex Fresnel zone regions, thereby allowing more complex shapes to be created. In the case of simple Fresnel lenses, the circles of FIG. 5A correspond to individual lens boundaries. More generally, they correspond to the point at which the relative amplitude of the individual element drops below a threshold value (~0.3=0.5 range usually). In this more general case, the influence of neighboring elements overlaps one another. As drawn, 5A is a hexagonal array of circular subapertures. In general, it consists of an array of subapertures. Thus, it could be an array of rectangles packed in a rectangular array.

It goes without saying that Fresnel type lenses are not required in the disclosed fly's eye arrangement. Further, although a hexagonal array is shown here, other regular arrays of elements can be used.

FIG. 6A is a Fresnel zone plate array pattern F and FIG. 6B is the resultant image F', this pattern being used to reference the Fresnel zone plate array with respect to table 53 supporting the work piece. In the preferred embodiment, subapertures 60 create a square comprised of lines 60' at the work piece, this square being used for coarse location of the other fiducials. Subaperture 61 creates a single point, 61', at the work piece. Subapertures 62 and 63 are used to create a focussing or Z-axis fiduciary. If the work piece is in the proper plane, then lines 62' and 63' should be coincident.

Overall alignment is easily understood. First the Fresnel zone plate array 55 is installed. Then a piece of scrap material that is the same thickness as the intended product is placed on table 53. Thereafter, using the fiducials on the mask (See $F_1$, $F_2$ and $F_3$ on FIGS. 3A and 4) the mask is aligned so that it has no tilt or de-focus with respect to the work piece. Also of course, you try to make it so that roughly by eye the Fresnel zone plate array has the right angular orientation to within reason. Then after having focused and leveled the work piece, the work piece 53' is shot with an image. Thereafter, the table is translated over to the microscope camera assembly 51. The required translation is precisely measured. This information is saved. Further, it can be repeated for more than one position. This calibration data is saved and utilized with any error correction data for the particular table 53 which error correction data is determined using techniques well known.

When you put a real work piece down you measure where the location of some fiducial marks on that work piece are. Knowing that then you can mathematically figure out what translation and rotation the work piece needs so that the projected hologram or Fresnel zone plate array subaperture patterns line up with the underlying pattern on the work piece. That is basically the alignment procedure.

If you do not have the mark the alignment fuducials F, the regular images present can be utilized for alignment. Specifically, you can do vertical alignment using a low precision Johansen block, just spacing the block so that level is obtained between the Fresnel zone plate array and table. For the transverse alignment any other 2 or 4 preferably small features generated by the Fresnel zone plate array itself can be used for alignment.

The above procedure can be accomplished with alternatively designed sets of fiducials or by using the set of shapes (A–X of FIG. 3A, A–L of FIG. 4) generated by plate 55, the end result in both cases being identical.

To register work piece 53' to the pattern projected by plate 55, fiducials on work piece 53' are first located by translating table 53 so they are within the field of view of offset microscope 51. Then a machine operator or a machine vision system can locate the fiducial center and store that information in central computer 39 (of FIG. 7). This process is repeated with at least two fiducials to gather translation and rotational positions. The data concerning the plate alignment is combined with the work piece alignment data to determine the required rotational and positional offsets.

Figure 7:
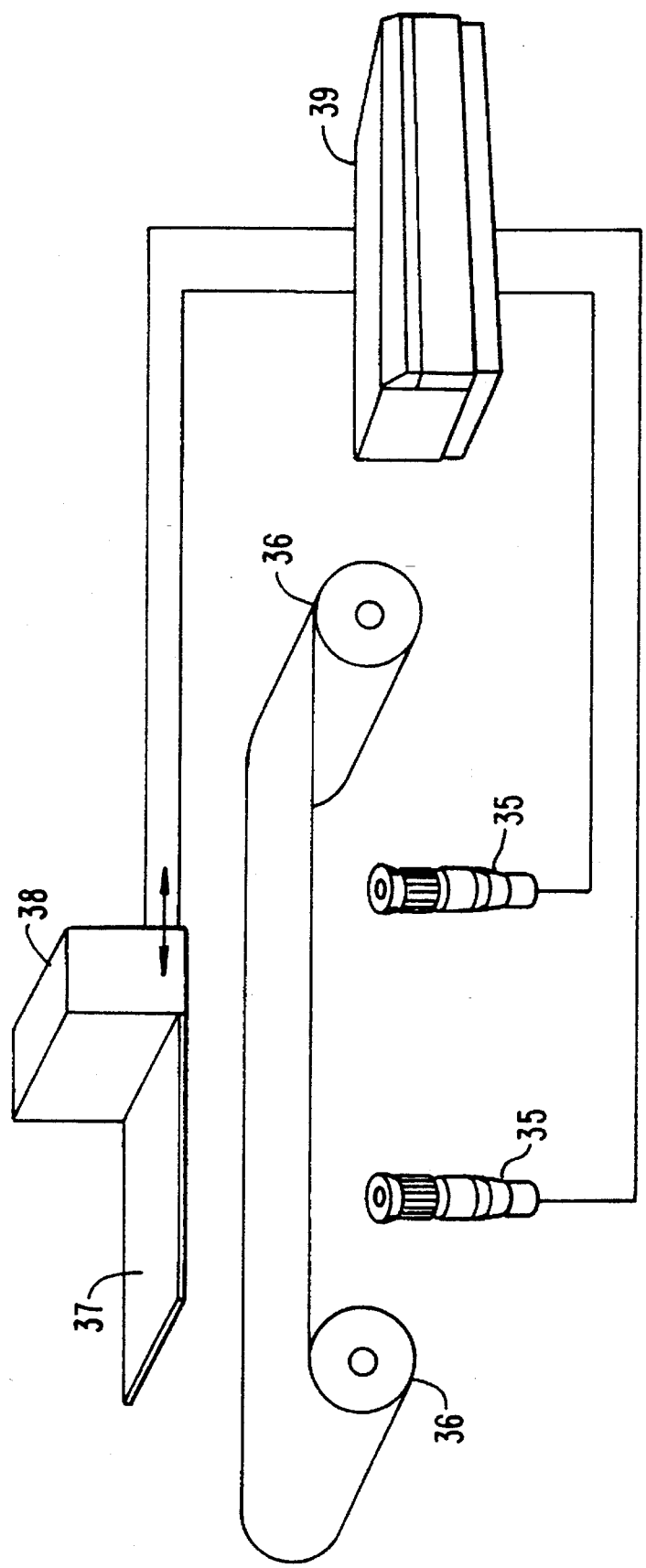
FIG. 7 is a view of a work piece including a roll of material being dispensed across an optical table for processing in accordance with this invention.

FIG. 7 is a view of a work piece including a roll of material being dispensed across a table for processing in accordance with this invention. The material is contained on two rollers 36, one on either side of the processing area. After a section of film has been processed, the material is spooled across the area, realigned, and a second set of patterns created. This procedure can continue indefinitely.

FIG. 7 shows a second embodiment of the alignment system. In this embodiment, two video camera sensors 35 are used in conjunction with subaperture plate 37 (containing fiduciary marks), XYZ positioner 38 and computer controller 39 to properly align the work piece film. As illustrated by FIG. 7, the use of two offset microscope/camera combinations set up so a mechanically registered work piece is within the microscope field of view allows work piece translation and rotation to be quickly acquired by the central computer (39) machine vision subsystem and the required offset computed and executed. This two microscope/camera combination gets rid of the motion step required with only one microscope/camera.

Figure 8:
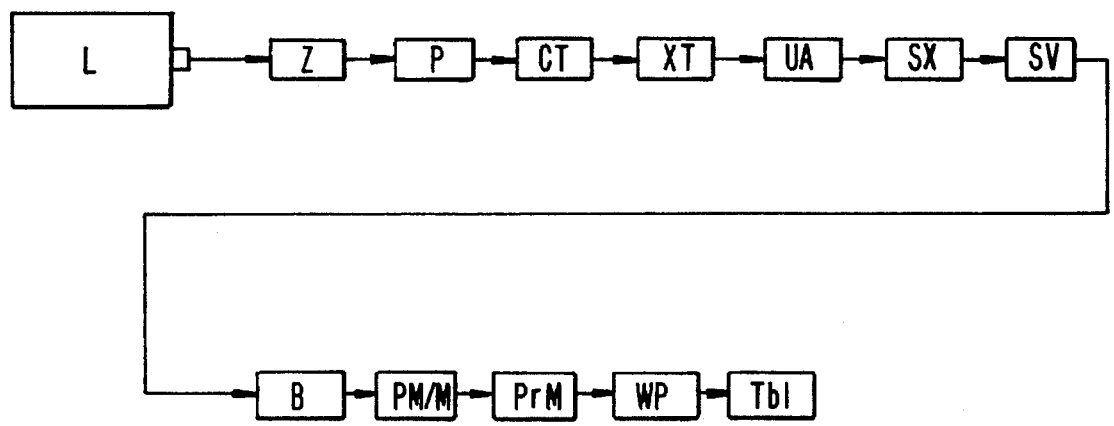
FIG. 8 is a block diagram useful in understanding the complete optical train illustrated in FIGS. 1 and 2 from a functional aspect.

FIG. 8 is a block diagram of the beam delivery system employed in FIGS. 1 and 2. The laser beam (step L) is aligned (step Z), stabilized (step P), collimated (step CT), and expanded (step XT). The steps of alignment, stabilization, collimation and expansion are well known in the art. Briefly, laser L is chosen for its beam divergence and brightness. In the case of excimer lasers, unstable resonators, oscillator amplifier combinations and Raman shifted excimers are particularly suitable. Z-path (46 and 47 of FIG. 1) allows the laser to be aligned to the tool of FIG. 1. Specifically, the point of incidence of the laser beam and the angularity of light at the point of incidence can be controlled. Pointer (P of FIG. 8) utilizes active, closed loop feedback to stabilize the laser beam pointing direction.

The collimating telescope (CT of FIG. 8, 48 of FIG. 1) takes out any residual focus in the laser beam. The expansion telescope (XT of FIG. 8, 49 of FIG. 1) allows the beam to be either expanded or compressed in size, the output being collimated light. Although drawn in FIG. 1 as two separately mounted lenses, in general it could be packaged as a unit for easily switching or as a zoom system allowing for discrete or continuous adjustment at different expansion/compression ratios.

A variable aperture 45 (see FIG. 2) is used to control the beam size (step VA). This prevents the beam from addressing more than one subaperture at a time (illustrated in FIGS. 3A and 4). The beam then encounters two fold mirrors. These fold mirrors not only position the beam onto the Fresnel zone plate array, but also can be used for scanning the beam either in the X-direction (step SX), the Y-direction (step SY), or both. The beam then traverses a coarse blocking mask that is either contact or proximity mounted to Fresnel zone plate array 55 (step B). This mask 62 (See FIG. 2 and 11), made of metal in the preferred embodiment, is mounted directly or just above or below the Fresnel zone plate array and has openings over each of the subaperture plate's active regions. This mask functions similarly to the throw away skirts surrounding the active regions, helping to eliminate undesired energy from ever reaching the work piece.

The shape of such a mask can be easily understood. Such a mask would define a dimension similar to areas 34 of the apertures (See FIG. 5B). Typically, the mask will have apertures spaced apart one from another to the end that adjacent apertures will not be inadvertently illuminated.

Next the beam impinges on the zone plate 55 (step PM/M) which in the preferred embodiment is mounted to an XY stage which also has rotational capability. Between the plate and the work piece is a proximity mask 69 (step PrM). This mask catches energy which has been diffracted away from the desired pattern by the throw away skirt surrounding each active region. Finally the patterned beam impinges on the work piece (step WP) which, in the preferred embodiment, is mounted to an XYZ stage work table 53. This table 53 may be provided with rotational capability (step Tbl).

Figure 11:
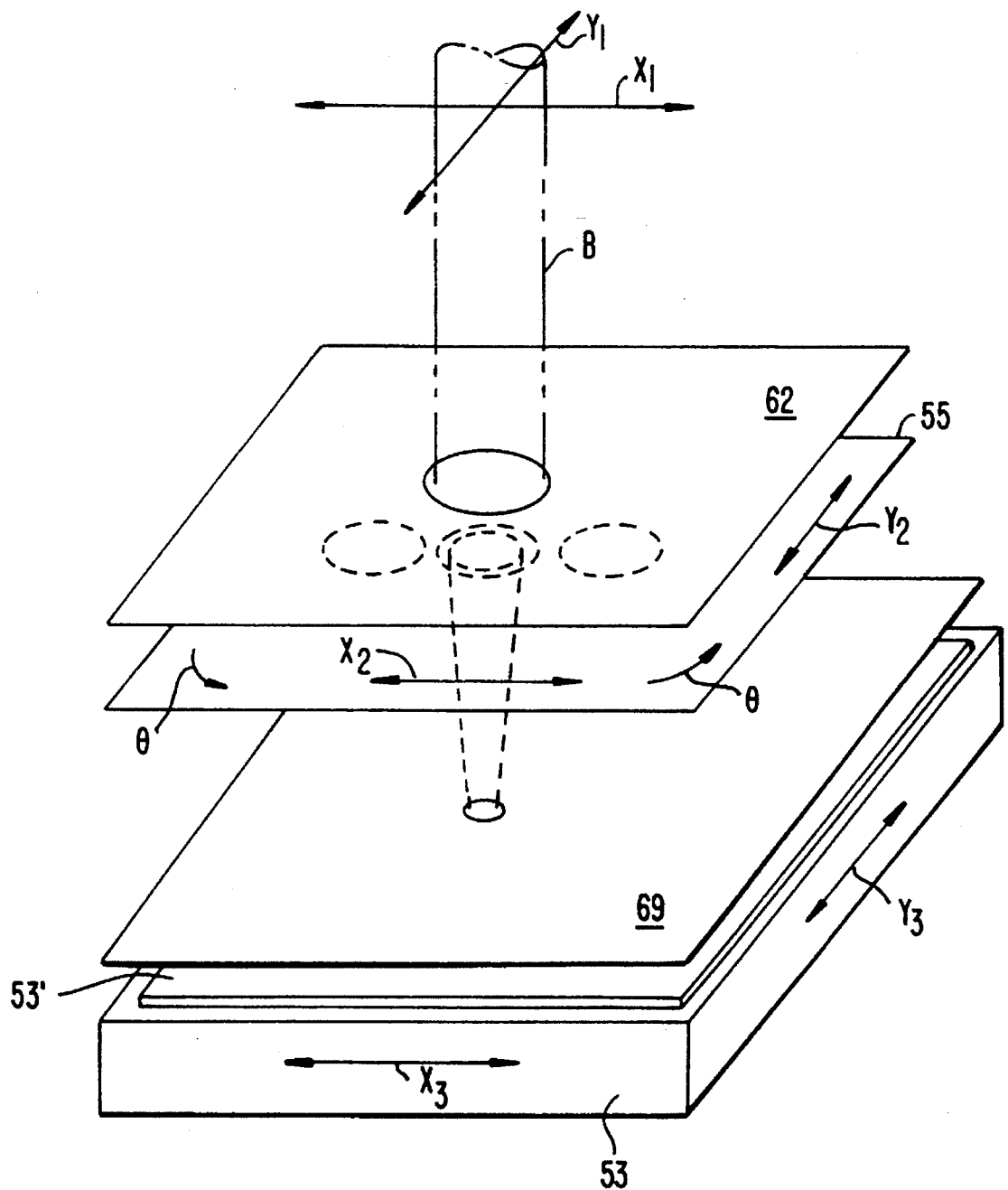

The particular degrees of motion can also be fully understood with reference to FIG. 11. Specifically, beam B is moveable in directions $X_1$, $Y_1$. Further, Fresnel zone plate array 55 is scanned in directions $X_2$, $Y_2$, and $\Theta$.

Figure 9:
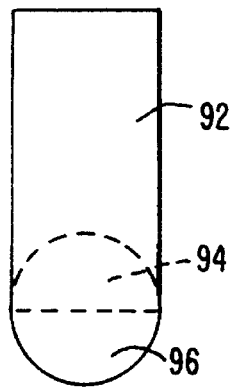
FIG. 9 is an illustration of a double exposure.

FIG. 9 illustrates a pattern generated on a work piece, parts of this pattern being exposed twice. In this example the Fresnel zone plate array generating this pattern would have two individual subapertures. The first subaperture creates rectangle 92. The second subaperture creates circle 96. Thus region 94, shown in dotted lines, has been exposed twice. Although it would be possible to make a single subaperture capable of forming this pattern, one of the benefits of the present invention is that a Fresnel zone plate array with a limited set of specific shapes (e.g., holes, lines) can be used to create an infinite number of patterns. Thus a specific subaperture does not have to be fabricated for each desired pattern.

Another use of the present invention is its ability to create arbitrary excisions in a dragging spot mode of operation. In this mode, the scanners 44 and 54 address a subaperture of plate 55, the subaperture being one which creates a small spot on the work piece 53' of suitable size and intensity. With the laser on, the X-Y table 53 moves the work piece around in the outline of the desired excision pattern. Although this technique is generally slower than creating a pattern using the full set of shapes on the plate, it is an option available to the user and supplements the use of the full set of shapes. This dragging excision technique can use any of the shapes available on plate 55. Thus, if a relatively large rectangular region requires ablation, subaperture D of FIG. 4 could be dragged back and forth, creating the desired effect.

Figure 10:
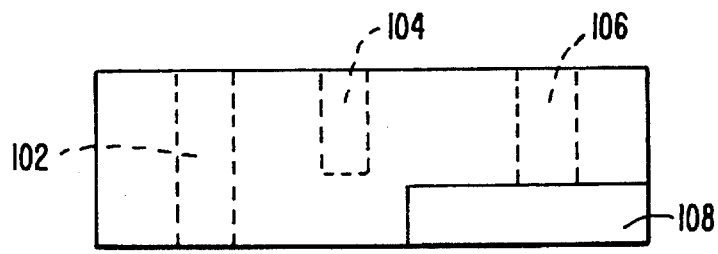
FIG. 10 illustrates the differences between a partially ablated pattern and a fully ablated pattern; and, FIG. 11 is a detail adjacent the work piece of the Fresnel zone plate array proximity plate and the Fresnel zone plate array, work piece proximity plate and work piece and table, this diagram illustrating the relative degrees of motion of the beam, Fresnel zone plate array and work piece.

Another of the benefits of the present invention is the ability to either partially or completely ablate a pattern. FIG. 10 is a cross-sectional view of a work piece. Region 102 shows a hole which has been completely ablated while region 104 shows only a partially ablated hole. The partially ablated hole can be formed by controlling the energy density of the beam or the number of pulses. Partially ablated hole 106 is formed by a different technique; the placement of a separate, non-absorbing layer 108 within the work piece. Thus the pattern used to form regions 102 and 106 may be the same, but because of the underlying non-absorbing layer 108 the results are different.

It will be understood that the apparatus of this invention finds preferred use with an excimer laser. Beams should be of a relatively long pulse and can preferably include about at least 5 round trips within the cavity. Other lasers can be used—applicable re-coating of the mirrors for optimum reflections may be required. In all other material aspects, the apparatus will remain unchanged.

A photographic Appendix A is filed with this case. Specifically, photographs of the actual Fresnel zone plates illustrated in FIGS. 3A and 5 are included.

The invention has now been explained with reference to specific embodiments. Other embodiments will be apparent to those of ordinary skill in the art. It is therefore not intended that this invention be limited, except as indicated by the appended claims.

What is claimed is:

1. Apparatus for processing a work piece with images produced by a Fresnel zone plate array having holographic images in a plurality of discrete subapertures on the Fresnel zone plate array, the apparatus including passing coherent light through the Fresnel zone plate array at selected subapertures to process the work piece comprising:

an optical frame for supporting in optically stable manner a plurality of optical elements defining an optical path on the frame;

a coherent light source for communicating coherent light to the optical path mounted on the frame;

a Fresnel zone plate array mounted to the frame having a plurality of discrete subapertures, with each said subaperture containing image information for the coherent light at a preselected distance from the subaperture on the Fresnel zone plate array;

means for addressing the coherent light from the optical path to less than all of the discrete subapertures on the Fresnel zone plate array to produce from at least one of the subapertures an image;

a work piece;

means for mounting and moving the work piece relative to the image for producing the image on the work piece at arbitrarily selected locations.

2. Apparatus for processing a work piece with images produced by a Fresnel zone plate array illuminated with coherent light source according to claim 1 and further including:

means for rotating the Fresnel zone plate array relative to the work piece for causing rotation of images from the subapertures of the Fresnel zone plate array on the work piece.

3. Apparatus for processing a work piece with images produced by a Fresnel zone plate array illuminated with coherent light source according to claim 2 and further including:

means for rotating the Fresnel zone plate array relative to the optical frame.

4. Apparatus for processing a work piece with images produced by a Fresnel zone plate array illuminated with coherent light source according to claim 1 and further including:

collimating optics in the optical path, the collimating optics being between the light source and the means for addressing coherent light.

5. Apparatus for processing a work piece with images produced by a Fresnel zone plate array illuminated with coherent light source according to claim 1 and wherein:

means for providing a variable aperture between the light source and the means for addressing the coherent light from the optical path to the discrete subapertures.

6. Apparatus for processing a work piece with images produced by a Fresnel zone plate array illuminated with coherent light source according to claim 1 and wherein:

the optical path includes beam sizing optics between the light source and the means for addressing coherent light.

7. Apparatus for processing a work piece with images produced by a Fresnel zone plate array illuminated with coherent light according to claim 6 and wherein:

the beam sizing optics expand the beam.

8. Apparatus for processing a work piece with images produced by a Fresnel zone plate array illuminated with coherent light source according to claim 6 and wherein:

the beam sizing optics includes an afocal telescope.

9. Apparatus for processing a work piece with images produced by a Fresnel zone plate array illuminated with coherent light source according to claim 1 and wherein:

mask means directly overlying the Fresnel zone plate array, the mask means for exposing the subaperture having the light registered thereto and shielding subapertures adjacent to the subaperture having the light registered thereto.

10. Apparatus for processing a work piece with images produced by a Fresnel zone plate array illuminated with coherent light source according to claim 1 and wherein:

stop means overlying the image at the work piece for exposing the work piece to receive the image and covering the work piece adjacent the image to prevent scattered light from contacting the work piece.

11. Apparatus for processing a work piece with images produced by a Fresnel zone plate array illuminated with coherent light source according to claim 1 and further including:

means for ventilating the work piece at the image.

12. A method for processing a work piece with images produced by a Fresnel zone plate array illuminated with coherent light source having holographic images in a plurality of discrete subapertures on the Fresnel zone plate array, the method comprising the steps of:

providing an optical frame for supporting in optically stable manner a plurality of optical elements defining an optical path on the frame;

placing a plurality of optical elements on the optical frame to define an optical path for collimated light;

providing and communicating a coherent light to the optical path;

providing a Fresnel zone plate array having a plurality of discrete subapertures, with each said subaperture containing image information by the coherent light at a preselected distance from the subaperture on the Fresnel zone plate array;

mounting the Fresnel zone plate array to the optical frame in the optical path for producing the images;

registering the coherent light from the optical path to less than all of the discrete subapertures on the Fresnel zone plate array to produce from at least one of the subapertures an image;

providing a work piece;

mounting and moving the work piece relative to the image for producing the image on the work piece at arbitrarily selected locations on the work piece whereby spatial relation of ablation on the work piece is independent of the spatial relation of the images from the Fresnel zone plate array.

13. A method for processing a work piece with images produced by a Fresnel zone plate array illuminated with coherent light source according to claim 12 and wherein:

rotating the Fresnel zone plate array relative to the work piece for causing rotation of images from the subapertures of the Fresnel zone plate array on the work piece.

14. A method for processing a work piece with images produced by a Fresnel zone plate array illuminated with coherent light source according to claim 12 and wherein:

the registering of the light to one of the discrete subapertures of the Fresnel zone plate array including scanning the plate.

15. A method for processing a work piece with images produced by a Fresnel zone plate array illuminated with coherent light source according to claim 12 and wherein:

rotating the Fresnel zone plate array relative to the optical frame.

16. A method for processing a work piece with images produced by a Fresnel zone plate array illuminated with coherent light source according to claim 12 and wherein:

providing a variable aperture between the light source and the means for addressing the coherent light from the optical path to the discrete subapertures; and, varying the variable aperture to correspond to a registered subaperture of the Fresnel zone plate array.

17. A method for processing a work piece with images produced by a Fresnel zone plate array illuminated with coherent light source according to claim 12 and wherein:

providing mask means directly overlying the Fresnel zone plate array, the mask means for exposing the subaperture having the light registered thereto and shielding subapertures adjacent to the subaperture having the light registered thereto.

18. A method for processing a work piece with images produced by a Fresnel zone plate array illuminated with coherent light source according to claim 12 and wherein:

providing stop means overlying the image at the work piece for exposing the work piece to receive the image and covering the work piece adjacent the image to prevent scattered light from contacting the work piece.

19. A method for processing a work piece with images produced by a Fresnel zone plate array illuminated with coherent light source according to claim 12 and wherein:

ventilating the work piece at the image.

20. A Fresnel zone plate array for producing images on a work piece at a discrete distance from the plate comprising:

a transparent plate for permitting passage of light through the plate;

a plurality of discrete subapertures on the plate, each said subaperture including, a first area containing means for shaping coherent light at a discrete distance from the plate and means for forming an image at the discrete distance from the plate;

at least three fiducial subapertures on the plate, the fiducial subapertures each including;

means for producing spaced apart images on the plate whereby the angular alignment of the plate can be verified; and, means for measuring towards and away positioning of the fiducial subapertures on the plate from a work piece whereby the plate can be aligned in parallel relation to a work piece.

21. A Fresnel zone plate array according to claim 20 and further including:

a second area circumscribing said first area, said second area for preventing light incident thereon from incidence to said image whereby light hitting said second area forms no part of said image.

22. In a Fresnel zone plate array for producing images from coherent light for processing a work piece disposed in a plane, a plate array including;

a plate disposed in a plane;

a plurality of discrete subapertures configured on the plate, with each said subaperture containing image information for broadcast by the coherent light on to a work piece at a preselected distance from the subaperture on the plate, a subaperture including a fiducial marker, the subaperture comprising:

means for forming an image at a discrete distance from the plate for permitting alignment of the plate perpendicular to a normal between the plane of the plate and the plane of the work piece;

first means for defining a first image at a first angle with respect to the plate;

second means for defining a second image at a second angle different from the first angle with respect to the plate whereby the relation between the first and second images is a function of the distance of a work piece from the plate.

23. The Fresnel zone plate array of claim 22 and wherein:

the plate includes at least three subapertures, each said subaperture having a fiducial marker.

24. The Fresnel zone plate array of claim 22 and wherein:

the means for forming an image at a discrete distance from the plate for permitting alignment of the plate perpendicular to a normal between the plane of the plate and the plane of the work piece includes a point source of light.

25. The Fresnel zone plate array of claim 23 and wherein:

the means for forming an image at a discrete distance from the plate for permitting alignment of the plate perpendicular to a normal between the plane of the plate and the plane of the work piece includes a boarder surrounding the point source of light.

26. A process of producing a complex ablation on a work piece utilizing a composite of images projected by coherent light from a Fresnel zone plate array, the process comprising:

providing a Fresnel zone plate array having a plurality of discrete subapertures, with a first said subaperture containing first image information for the coherent light at a preselected distance from the first said subaperture on the plate and a second said subaperture containing second and different image information for the coherent light at a preselected distance from the second said subaperture on the plate;

providing a light source for sequentially registering to the first said and the second said subapertures of the plate whereby the images of the first said and second said subapertures can be sequentially formed by the coherent light from the plate;

providing a work piece spaced relative to the plate for enabling images produced by the first said and second said subapertures of the plate to ablate the work piece;

registering the light source, the first said subaperture and work piece to produce ablation of a first area on the work piece;

registering the light source, the second said subaperture and work piece to produce ablation of a second area on the work piece, the second area at least continuous to a part of the first area whereby the ablation of the work piece is in a pattern which is a composite of the first and second images.

27. A process of producing a complex ablation on a work piece utilizing a composite of images from a Fresnel zone plate array according to claim 26 and wherein the registering steps include:

registering the first and second images to the first and second areas includes overlapping the first and second areas.

28. A Fresnel zone plate array including:

a plate for containing subapertures;

a plurality of discrete subapertures on the plate, with each said subaperture containing image information for coherent light at a preselected distance from the subaperture on the plate;

at least a first of the subapertures having a working distance and first angle with respect to the plate for forming an image at a discrete distance and angularity from the plate; and, at least a second of the subapertures having a working distance and second angle with respect to the plate for forming a substantially identical image, the working distance and first and second angle chosen to register the identical images one to another on the work piece.

29. A Fresnel zone plate array according to claim 28 and further including:

a multiplicity of the subapertures exceeding two having the same working distances and differing angles for forming the identical image on the work piece at an identical location.

30. A process of utilizing a Fresnel zone plate array for producing images from coherent light including the steps of:

providing a Fresnel zone plate array having a plurality of discrete subapertures, with each said subaperture containing image information for the coherent light at a preselected working distance from said subaperture on the plate;

providing at least a first of the subapertures having a working distance and first angle with respect to the plate for forming an image at a discrete distance and angularity from the plate;

providing at least a second of the subapertures having a working distance and second angle with respect to the plate for forming a substantially identical image, the working distance and first and second angle chosen to register the identical images one to another on the work piece;

registering a beam of coherent light to be incident simultaneously on the first and second subapertures whereby the identical image is a combination of beam intensity at the first and second subapertures.

31. A process of utilizing a Fresnel zone plate array according to claim 30 and wherein:

providing a multiplicity of the subapertures exceeding three having the same working distances and differing angles for forming the identical image on the work piece at an identical location;

registering a beam of coherent light to be incident simultaneously on the multiplicity of subapertures whereby the identical image is a combination of beam intensity at the multiplicity subapertures.

* * * * *